United States Patent [19]
Krysiak et al.

[11] Patent Number: 5,270,091
[45] Date of Patent: Dec. 14, 1993

[54] WINDOW MASTIC STRIP HAVING IMPROVED, FLOW-RESISTANT POLYMERIC MATRIX

[75] Inventors: Gary D. Krysiak, Strongsville; James A. Box, Broadview Heights, both of Ohio

[73] Assignee: Tremco, Inc., Beachwood, Ohio

[21] Appl. No.: 870,732

[22] Filed: Apr. 16, 1992

Related U.S. Application Data

[63] Continuation-in-part of Ser. No. 710,224, Jun. 4, 1991, abandoned.

[51] Int. Cl.⁵ .......................... B32B 1/04; E06B 3/24
[52] U.S. Cl. ......................... 428/68; 428/34; 428/76; 428/162; 428/182; 52/172; 52/790
[58] Field of Search .......... 428/34, 68, 72, 81, 428/162, 161, 141, 181, 152, 192, 295, 344, 409, 539.5, 542.8; 52/171, 172, 788–789, 790; 156/107, 109; 49/479, 486, 488, 495

[56] References Cited

U.S. PATENT DOCUMENTS

| | | | |
|---|---|---|---|
| 3,218,373 | 11/1965 | Salyer | 525/387 |
| 3,791,910 | 2/1974 | Bowser | 52/172 |
| 4,226,063 | 10/1980 | Chenel | 52/172 |
| 4,268,553 | 5/1981 | Marzouki et al. | 52/790 |
| 4,411,115 | 10/1983 | Marzouki et al. | 52/790 |
| 4,431,691 | 2/1984 | Greenlee | 52/172 |
| 4,994,309 | 2/1991 | Reichert et al. | 52/790 |

*Primary Examiner*—Donald J. Loney
*Attorney, Agent, or Firm*—Gunther J. Evanina; David P. Dureska

[57] ABSTRACT

The present invention is directed to a deformable window strip used to separate and seal two panes of glass. More specifically, the deformable window strip of the present invention comprises a flow resistent polymeric matrix which substantially decreases the need for rheological modifiers.

7 Claims, 1 Drawing Sheet

WINDOW MASTIC STRIP HAVING IMPROVED, FLOW-RESISTANT POLYMERIC MATRIX

This is a continuation-in-part of application Ser. No. 07/710,224, filed Jun. 4, 1991, now abandoned.

FIELD OF THE INVENTION

The present invention is directed to a deformable window strip used to separate and seal two panes of glass. More specifically, the deformable window strip of the present invention comprises a flow resistent polymeric matrix which substantially decreases the need for rheological modifiers.

BACKGROUND OF THE INVENTION

Deformable, tacky tapes in general have been used to seal windows. However, such tapes can be problematic when used in sealing two window panes to form an insulated glass or "IG" unit. Such IG units must meet performance requirements which generally are far more demanding than single pane glazing.

In an IG unit, the space between the window panes is sealed, typically at room temperature and ambient pressure. Once installed, the temperature between the glass panes can increase dramatically during the summer and decrease dramatically during the winter. Since the air space is sealed, as the temperature changes, the pressure also changes—the air space will generally cause inward pressure to the window panes during winter and outward pressure during summer.

Such pressure changes can cause shifting of the window panes relative to one another, and the increased temperature during the summertime can soften the mastic. Over years of such temperature and pressure cycling, the mastic tape can exhibit unwanted flow.

As a result, rheological modifiers are generally added to tacky, deformable mastic tapes. However, rheological fillers can be hazardous. For example, many rheological modifying fibers and particles, particularly asbestos, can be harmful, if inhaled.

Carbon black is a rheological filler which is not particularly hazardous, relatively speaking, but can be messy and unpleasant to use. Furthermore, carbon black is manufactured generally by burning vaporized heavy oil fractions in a partial combustion reaction; such a manufacturing process is not particularly friendly to the environment, and consumers are increasingly interested in supporting environmentally friendly products.

Consequently, a need exists to provide an improved polymer matrix for window mastic strips, particularly for use in IG units, so that high loadings of rheological modifiers are no longer necessary.

SUMMARY OF THE INVENTION

The present invention is directed to a deformable window mastic strip which is particularly well suited for use in insulated glass ("IG") units. The window strip comprises a polymer matrix having superior resistance to flow over many conventionally known systems. In the preferred embodiment, the polymer matrix is a semi-interpenetrating network. In an alternative embodiment which is also preferred, the polymer matrix is a cured rubber, most preferably a halogenated butyl or the like.

The semi-interpenetrating network is preferably formed by using a blend of butyl rubber and polyisobutylene. Polyisobutylene comprises long saturated chains of unfunctionalized, isobutylene units and is therefore generally not capable of being crosslinked. On the other hand, the preferred butyl rubber is a copolymer of predominantly isobutylene, preferably about 97 to about 99 mole percent, with a small amount of isoprene, (preferably about 1 to about 3 mole percent). The isoprene portion provides a cure site for vulcanization (crosslinking).

To form the semi-interpenetrating network, the butyl rubber and the polyisobutylene are mixed together, thereby entangling the chains of the two polymers. Then a curative is added, and the butyl rubber substantially cross links while substantially no reaction occurs with the polyisobutylene portion of the blend.

The preferred curatives must provide a stable final product, and should not exhibit additional post-cure or bond reversion. Sulfur cure systems are not preferred, due to their ready reversion at high temperatures. Preferably a phenol/formaldehyde (resole) resin is used to cure the butyl rubber to provide a thermally stable crosslink. Once these crosslinks are formed, they generally do not revert at temperatures under 400° F., making them particularly well suited for a window strip application.

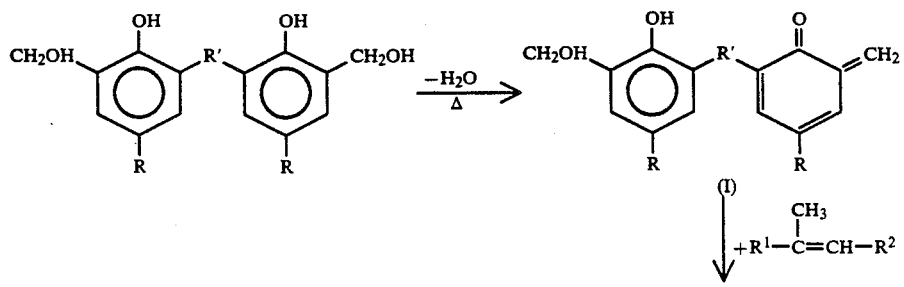

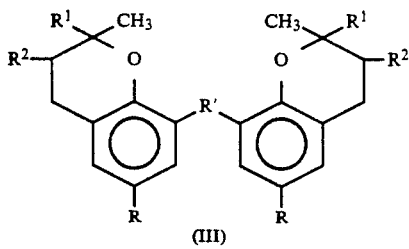 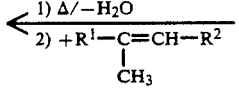 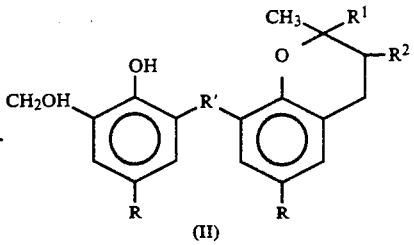

FIG. A

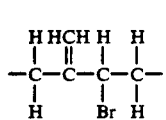  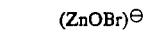

The phenolic resin crosslinking occurs via a chroman mechanism as shown in FIG. A. In this Figure, the triangle symbolizes the addition of heat, wherein the temperature of the mixture is raised to about 125° to about 150° C. In FIG. A, each R can be the same or different and can be any organic group; R' is an alkyl, preferably unsubstituted and preferably devoid of alkene or aryl functionality; and R1 and R2 are isobutylene chains of any length. The reaction mechanism requires a bis or oligomeric phenol which contains no independent o-hydroxymethyl (otherwise referred to as "o-methylol") groups. Dehydration of the phenol produces an o-methylene quinone intermediate (I), which then adds to the isoprene portion of the butyl rubber by a 1,4-cycloaddition resulting in a crosslinked product having a bischroman structure (III) as shown in FIG. A. The butyl/PIB blends result in a tape which is generally more flow resistant than many conventional glazing polymer matrices.

An interesting observation was made in developing the semi-interpenetrating network. The resistance to flow did not change significantly when the polymer matrix was "softened" from an extruded penetration of 4.5 millimeters to an extruded penetration of 3.2 millimeters, according to ASTM C782-86. The polymer matrix was softened by using a low molecular weight polyisobutylene plasticizer, while keeping the crosslink density constant. Consequently, the polymer matrix can be softened to feel more "thermoplastic" or hardened to feel more "rubbery", depending upon the needs or preference of a customer, without substantially changing the resistance to flow. Some customers may prefer an extremely soft, tacky mastic tape and other customers may prefer the look and feel of a tacky, rubbery gasket. This chemistry is potentially capable of accommodating both.

Critical to the interpenetrating polymer matrix of the present invention is that there be:

1. a rubber base material, such as the polyisobutylene and the butyl rubber of the preferred embodiment (other potentially useful rubber base materials include polysulfide, EPDM rubber nitrile rubber, or the like);
2. a curative, such as phenol/formaldehyde resin of the preferred embodiment; and
3. mixing of the base material and curative prior to curing.

The crosslinking of the base material should be sufficient to inhibit unwanted flow, but should not be so great as to make the final product s rigid as to be incapable of accommodating movement and shifting by window panes when incorporated into a glazing strip.

In an alternative embodiment of the present invention, the flow resistant polymer matrix is created by vulcanizing the rubber base material without creating a semi-interpenetrating network. Such a polymer matrix is possible by curing a halogenated butyl polymer by means of a catalyst. The most preferred halogenated butyl polymer is bromobutyl, and the most preferred curing catalyst is zinc oxide.

As shown in FIG. C, during bromination of the isoprenoid unit of butyl rubber, an allylic bromine structure involving an exomethylene group appears as the predominant reactive structure of the brominated structures. Nuclear magnetic resonance analysis indicates that up to about 90% of the bromine is allylic to the double bond, as shown in FIG. B. The crosslinking of bromobutyl rubber with zinc oxide involves the formation of carbon-carbon bonds through typical alkylation chemistry. The bromobutyl dehydrohalogenation forms a zinc hypobromite catalyst which is a key feature of this crosslinking chemistry. The original unsaturation is largely retained, either isomerized as shown in FIG. B or to a much lesser extent, in a variety of other forms. As visualized in the initial crosslinking step in the presence of zinc oxide, bromine is eliminated from the structure shown in FIG. B to form an allylic carbocation, as shown in FIG. C. Crosslinking then proceeds through a cationic polymerization route. The propagation step typically does not proceed very far; however, only one step is needed, because termination produces more catalyst which in turn initiates more crosslinking.

Regardless of any particular embodiment, critical to the present invention is a polymer matrix which is sufficiently crosslinked to provide adequate resistance to flow when used in a insulated glass window strip system. Preferably, the base material should not comprise more than 10 mole percent of monomer having crosslinkable functionality, more preferably, not more than 5 mole percent, even more preferably not more than 3 mole percent and most preferable between 0.05 to about 1.6 mole percent crosslinkable monomeric units.

In the preferred embodiment, the window strip also comprises a spacer member. This spacer preferably is an undulating strip wherein if a z-axis is envisioned penetrating through the top, middle and bottom of the strip and if the strip were viewed along a plane of the z-axis, the undulations would preferably appear similar to a sine or cosine curve along the x and y axis. The undulations provide stability and inhibit the spacer from rolling over when subjected to the temperature and pressure cycles of a typical insulated glass unit. The spacer preferably also provides a barrier to vapor penetration through the window strip, and therefore preferably is made from a moisture impermeable material. The most preferred moisture impermeable material is a plastic, such a polyethylene terephthalate, having sufficient structural integrity as to resist compressive forces typically encountered by an insulated glass unit. Plastic is preferred over metal, since plastic has a much lower capacity for transferring heat across the strip.

The spacer undulations also allow for easy cornering around the periphery of an insulated glass unit, since the spacer can be easily bent around corners. It is not critical that the spacer be an undulating strip; what is critical is that the spacer have a configuration which inhibits roll-over, resists compressive forces, provides a barrier to moisture transmission, allows for easy bending around corners, and does not unduly transfer heat across the strip when incorporated into a insulated glass unit.

The preferred strip further comprises desiccant. The desiccant can be incorporated within the deformable sealant matrix, within the spacer means or within a facing material applied to a surface of the strip.

The preferred strip further comprises talc or other light colored, non-reinforcing filler. Such a filler will provide the strip with a light color, and such a color is advantageous, because it will not absorb as much heat as a black strip and therefore is less likely to soften during the summer months and cause unwanted flow.

DETAILED DESCRIPTION OF THE PREFERRED EMBODIMENT

Figure 1:
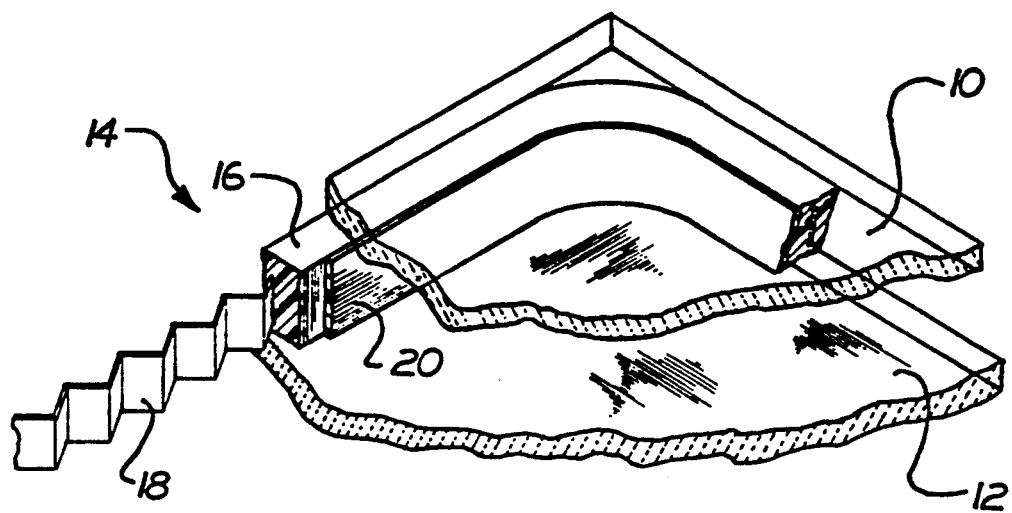
FIG. 1 is a fragmentary perspective view, with parts in section, showing a first embodiment of the present invention.

FIG. 1 illustrates the preferred window strip of the present invention comprising first member 10 and second member 12 having facing, generally parallel surfaces, spaced a finite distance from each other, and means for maintaining members 10, 12 in such spaced relationship and for effecting a seal between the facing surfaces thereof, comprising a sealant and spacer strip of the present invention, designated generally as 14.

Members 10, 12 as illustrated are formed of glass. However, it will be appreciated that the invention has applicability in the environment of an unrestricted variety of construction or structural materials including, without limitation, plexiglass, acrylic sheets, and the like.

As further illustrated in FIG. 1, sealant and spacer strip 14 comprises elongated ribbon 16 of deformable sealant. In the preferred embodiment, the deformable sealant comprises a polymer matrix which is a semi-interpenetrating network. Interpenetrating polymer networks in general are well known, and involve the formation of two polymers "in situ" without crosslinking between the two species of polymers. In the present invention, crosslinking is conducted during the polymerization, but to a very limited extent and only with respect to one species (the other species polymerizes substantially without any crosslinking).

The semi-interpenetrating network of the present invention provides polymers matrices which are superior to the flow-resistant properties obtained when two polymers are formed separately and then mixed, or when chemical crosslinks are formed between the two species.

Interpenetrating polymer networks ("I.P.N.'s") in general are discussed in detail in the "Application of Group Theory Concepts to Polymer Blends Grafts and I.P.N.'s", Advances in Chemistry Series No. 154, American Chemical Society, Washington D.C. 1976, pages 159–178.

The semi-interpenetrating network is preferably formed by using a blend of butyl rubber and polyisobutylene. Polyisobutylene comprises long saturated chains of unfunctionalized, isobutylene units and is therefore generally not capable of being crosslinked. On the other hand, the preferred butyl rubber is a copolymer of predominantly isobutylene, preferably about 97 to about 99 mole percent, with a small amount of isoprene, (preferably about 1 to about 3 mole percent). The isoprene portion provides a cure site for vulcanization (crosslinking).

To form the semi-interpenetrating network, the butyl rubber and the polyisobutylene are mixed together, thereby entangling the chains of the two polymers. Then a curative is added, and the butyl rubber substantially cross links while substantially no reaction occurs with the polyisobutylene portion of the blend.

The preferred curatives must provide a stable final product, and should not exhibit additional post-cure or bond reversion. Sulfur cure systems are not preferred, due to their ready reversion at high temperatures. The preferred curative is a phenol/formaldehyde (resole) resin which cures butyl rubber with a thermally stable crosslink. Once these crosslinks are formed, they generally do not revert at temperatures under 400° F., making them particularly well suited for window strip application.

The phenolic resin crosslinking occurs via a chroman mechanism as shown in FIG. A. In this Figure, the triangle symbolizes the addition of heat, wherein the temperature of the mixture is raised to about 125° to about 150° C. In FIG. A, each R can be the same or different and can be any organic group; R' is an alkyl, preferably unsubstituted and preferably devoid of alkene or aryl functionality; and R1 and R2 are isobutylene chains of any length. The reaction mechanism requires a bis or oligomeric phenol which contains no independent o-hydroxymethyl (otherwise referred to as "o-methylol") groups. Dehydration of the phenol produces an o-methylene quinone intermediate (I), which then adds to the isoprene portion of the butyl rubber by a 1,4-cycloaddition resulting in a crosslinked product having a bischroman structure (III) as shown in FIG. A. The butyl/PIB blends result in a tape which is generally more flow resistant than many conventional glazing polymer matrices.

An interesting observation was made in developing the semi-interpenetrating network. The resistance to flow did not change significantly when the polymer matrix was "softened" from an extruded penetration of 4.5 millimeters to an extruded penetration of 3.2 millimeters, according to ASTM C782-86. The polymer matrix was softened by using a low molecular weight polyisobutylene plasticizer, while keeping the crosslink density constant. Consequently, the polymer matrix can be softened to feel more "thermoplastic" or hardened to feel more "rubbery", depending upon the needs or preference of a customer, without substantially changing the resistance to flow. Some customers may prefer an extremely soft, tacky mastic tape and other customers may prefer the look and feel of a tacky, rubbery gasket. This chemistry is potentially capable of accommodating both.

Critical to the interpenetrating polymer matrix of the present invention is that there be:

1. a rubber base material, such as the polyisobutylene and butyl rubber of the preferred embodiment (other potentially useful rubber base materials include polysulfide, EPDM rubber nitrile rubber, or the like);
2. a curative, such as phenyl/formaldehyde resin of the preferred embodiment; and
3. mixing of the base material and curative prior to curing.

The crosslinking of the base material should be sufficient to inhibit unwanted flow, but should not be so great as to make the final product so rigid as to be incapable of accommodating movement and shifting by window panes when incorporated into a glazing strip.

Possible alternative base materials would include ethylene copolymers which are generally well known in the art; their properties and methods for their preparation are more fully discussed in U.S. Pat. No. 3,218,373, which patent is hereby incorporated herein by reference. The ethylene copolymer rubber may be cross-linked or non-crosslinked. If a cross-linked ethylene copolymer rubber is used, it may be cross-linked by contacting the ethylene copolymer rubber with a peroxide catalyst and heating, by radiation, or by any other known method. The rubbery copolymers which may be useful include copolymers comprising ethylene, vinyl acetate, and alkyl acrylate or methacrylate.

Other possible rubbery copolymers include copolymers comprising the polymerization product of 1. allyl, methallyl, crotyl, 1-chloroallyl, 2-chlorallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, succinic, glutaric, adipic, pimelic, suberic, azelaic, maleic, fumaric, citraconic, mesaconic, itaconic, benzoic, phenylacetic, phthalic, terephthalic, benzoylphthalic, etc., acids;
2. saturated monohydric alcohol esters, e.g., the methyl, ethyl, propyl, isopropyl, butyl, sec-butyl, amyl, etc., esters of ethylenically unsaturated aliphatic monobasic and polybasic acids, illustrative examples of which appear above;
3. (meth)acrylic acid;
4. vinyl compounds (including monovinyl aromatic hydrocarbons) e.g., styrene, o-, m-, and p-chlorostyrenes, -bromostyrenes, -fluorostyrenes, -methylstyrenes, -ethylstyrenes, -cyanostyrenes;
5. various poly-substituted styrenes such, for example, as the various di-, tri-, and tetra-chlorostyrenes, -bromostyrenes, -flourostyrenes, -methylstyrenes, -ethylstyrenes, -cyanostyrene, etc., vinyl naphthalene, divinyl benzene, trivinyl benzene, allyl benzene, diallyl benzene, the various allyl cyanostyrenes;
6. various alpha-substituted styrenes and alpha-substituted ring substituted styrenes, e.g., alpha-methyl styrene, alpha-methyl para-methyl styrene, etc.;
7. unsaturated ethers, e.g., ethyl vinyl ether, diallyl ether, etc.;
8. unsaturated amides, for instance, acrylamide and N-substituted acrylamides, e.g., N-methylol acrylamide, N-allyl acrylamide, N-methylacrylamide, N-phenyl acrylamide, etc.;
9. unsaturated ketones, e.g., methyl vinyl ketone, methyl allyl ketone, etc.;
10. unsaturated polyhydric alcohol (e.g., butenediol, etc.);
11. esters of saturated and unsaturated, aliphatic and aromatic, monobasic and polybasic acids, and the like;
12. vinyl halides, more particularly vinyl chloride, vinyl bromide and vinyl iodide, and the various vinylidene compounds, including vinylidene bromide, vinylidene fluoride and vinylidene iodide;
13. acrylonitrile, and other compounds, e.g., the various substituted acrylonitriles (e.g. methacrylontrile, ethacrylontrile, phenylacrylonitrile, etc. );
14. the various N- substituted acrylamides and alkacrylamides, for instance, N-dialkyl acrylamides and methacrylamides, e.g. N-dimethyl, -diethyl, -dipropyl, -dibutyl, etc.;
15. acrylamides and methacrylamide, also other acrylates and methacrylates such as methyl acrylate, n-hexyl acrylate, t-butyl methacrylate, stearly methacrylate and the like; and
16. organic dichlorides, sodium polysulfides an the like.

In an alternative embodiment of the present invention, the flow resistance polymer matrix is created by vulcanizing the rubber base material without creating a semi-interpenetrating network. Such a polymer matrix is possible by curing a halogenated butyl polymer by means of a catalyst. The most preferred halogenated butyl polymer is bromobutyl, and the most preferred curing catalyst is zinc oxide.

As shown in FIG. B, during bromination of the isoprenoid unit of butyl rubber, an allylic bromine structure involving an exomethylene group appears as the predominant reactive structure of the brominated structures. Nuclear magnetic resonance analysis indicates that up to about 90% of the bromine is allylic to the double bond, as shown in FIG. B. The crosslinking of bromobutyl rubber with zinc oxide involves the formation of carbon-carbon bonds through typical alkylation chemistry. The bromobutyl dehydrohalogenation forms a zinc hypobromite catalyst which is a key feature of this crosslinking chemistry. The original unsaturation is largely retained, either isomerized as shown in FIG. B or to a much lesser extent, in a variety of other forms. As visualized in the initial crosslinking step in the presence of zinc oxide, bromine is eliminated from the structure shown in FIG. B to form an allylic carbocation, as shown in FIG. C. Crosslinking then proceeds through a cationic polymerization route. The propagation step typically does not proceed very far; however, only one step is needed, because termination produces more catalyst which in turn initiates more crosslinking.

Whether or not the polymerization is a traditional vulcanization polymerization or an interpenetrating or semi-interpenetrating network polymerization, depending on the base material chosen, suitable catalyst in crosslinking the rubber base material could include for example, the organic peroxides such as methyl ethyl ketone peroxide, benzoyl peroxide; the hydroperoxides such as cumene hydroperoxide; the peroxydicarbonates, such as diisopropyl peroxydicarbonate or di (2-ethyl hexyl) peroxydicarbonate; the persulfate type compounds such as potassium persulfate, or catalysts such as azobisisobutyronitrile and the like.

Additionally, such catalysts as lauroyl peroxide, 2,5-dimethyl-2,5-di(t-butylperoxy) hexane, the dialkyl peroxides, e.g., diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiaryamyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc., unsymmetrical or mixed diacyl peroxides, e.g. acetyl benzoyl peroxide, propionyl benzoyl peroxide, etc., terpene oxides, e.g. ascaridole, etc.; and salts of inorganic peracids, e.g. ammonium persulfate, sodium persulfate, sodium percarbonate, potassium percarbonate, sodium perborate, potassium perborate, sodium perphosphate, potassium perphosphate, potassium persulfate, etc. may be used.

Other organic peroxide catalysts which may be employed are the following: 1,1,3,3-tetramethyl butyl peroxy-2,2-diethyl butyrate, 2,5-dimethyl-2,5-di(neodecanoyl peroxy) hexane, 3-methyl-3-(pivaloyl peroxy) butene-1, acetyl 2-chloro octanoyl peroxide, acetyl sec-heptyl sulfonyl peroxide, t-butyl peroxyneodecanoate, 2,7-dimethyl-2,7-di(pivaloyl peroxy) octane, acetyl peroxy isobutyl carbonate, tetralin hydroperoxide, tertiary-butyl diperphthalate, tertiary-butyl perbenzoate, 2,4-dichlorobenzoyl peroxide, urea peroxide, caprylyl peroxide, p-chlorobenzoyl peroxide, 2,2-bis(tertiary butyl-peroxy) butane, hydroxyheptylperoxide, the diperoxide of benzaldehyde and the like. Generally the catalysts may be employed in amounts ranging from about 0.01 percent to 10.0 percent by weight, based on the weight of the monomer employed. The preferred catalyst is t-butyl peroxypivalate.

Alternatives to peroxide catalysts would include: metal oxides, such as zinc oxide, lead oxide, and the like; heat reactive alkylphenol formaldehyde resins; and organic diamines.

Regardless of any particular embodiment, critical to the present invention is a polymer matrix which is sufficiently crosslinked to provide adequate resistance to flow when used in a insulated glass window strip system. Preferably, the base material should not comprise more than 10 mole percent of monomer having crosslinkable functionality, more preferably, not more than 5 mole percent, even more preferably not more than 3 mole percent and most preferable between about 0.05 to about 1.6 mole average percent crosslinkable monomeric units.

In the preferred embodiment, the window strip also comprises a spacer member. In the preferred embodiment illustrated in FIG. 1, spacer means 18 takes the form of an undulating sheet of rigid material. It will be noted that all of the surfaces and edges of spacer means 18 are in intimate contact with ribbon 16. This spacer preferably is an undulating strip wherein if a z-axis is envisioned penetrating through the top, middle and bottom of the strip and if the strip were viewed along a plane of the z-axis, the undulations would preferably appear similar to a sine or cosine curve along the x and y axis. The undulations provide stability and inhibit the spacer from rolling over when subjected to the temperature and pressure cycles of a typical insulated glass unit. The spacer preferably also provides a barrier to vapor penetration through the window strip, and therefore preferably is made from a moisture impermeable material. The most preferred moisture impermeable material is a plastic having sufficient structural integrity as to resist compressive formed typically encountered by an insulated glass unit. Plastic is preferred over metal, since plastic has a much lower capacity for transferring the across the strip.

The spacer undulations also allow for easy cornering around the periphery of an insulted glass unit, since the spacer can be easily bent around corners. It is not critical that the spacer be an undulating strip; what is critical is that the spacer have a configuration which inhibits roll-over, resists compressive forces, provides a barrier to moisture transmission, allows for easy bending around corners, and does not unduly transfer heat across the strip when incorporated into an insulated glass unit.

Due to the geometry of spacer means 18 as illustrated in FIG. 1, it is capable of resisting compressive forces exerted on it in a plane which is normal to a plan in which the longitudinal axis of spacer means 18 lies, and which plane is coincident with a plan which is normal to the planes in which members 10, 12 lie. Thus, spacer means 18 is capable of resisting compressive forces tending to reduce the spacing between members 10, 12, and is thereby capable of maintaining members 10,12 a predetermined finite distance from each other.

The preferred strip further comprises desiccant. The desiccant can be incorporated within the deformable sealant matrix, within the spacer means or within a facing material applied to a surface of the strip.

The preferred strip further comprises talc or other light colored, non-reinforcing filler. Such a filler will provide the strip with a light color, and such a color is advantageous, because it will not absorb as much heat as a black strip and therefore is less likely to soften during the summer months and cause unwanted flow.

Where the invention is applied to the fabrication of multiple panel strictures of transparent material, such as glass or plastic, the interior, vertical surface of sealant and spacer strip 14 is visible in the completed unit. In many commercial assemblies, this surface has a finished look since it corresponds to the bottom outside surface of a permanently installed metal spacer member. Where it is desired to provide as aesthetically pleasing corresponding surface on the sealant and spacer strip of the present invention, the previously described indicia may serve this dual function. Thus, the interior, vertical surface of sealant and spacer strip 14 may be provided with decorative facing 20, which may be adhesively or cohesively applied, or coextruded with sealant and spacer strip 14.

When facing 20 is positioned perpendicularly to the surfaces of members 10, 12 and interiorly of their peripheral edges, it functions both as a means for orienting spacer means 18, and as a means providing the exposed interior, vertical surface of sealant and spacer strip 14 with an aesthetically pleasing, decorative facing.

An additional advantage of the configuration of spacer means 18 illustrated in FIG. 1 is that it permits sealant and spacer strip 14 to be bent readily around corners. This capability is particularly desirable where the sealant and spacer strip is employed in the fabrication of multiple panel units, which acts as a thermal insulting barrier, e.g., double glazed thermal insulating windows. In such units, the air space between the two panel members is sealed from the atmosphere. The fewer joints which are employed in establishing the seal, the less is the risk of failure of the seal, which failure is most likely to take place at a joint. Since sealant and spacer strip 14 can be bent around corners, a peripheral seal can be effected with only one joint.

As previously noted, in the preferred embodiment elongated ribbon 16 of deformable sealant envelopes and completely embeds spacer means 18. The thickness to which elongated ribbon 16 extends beyond the surfaces and edges of spacer means 18 is preferably in the range of about 0.005 to about 0.060 inches and more preferably about 0.0075 to about 0.015 inches. The thickness of the enveloping sealant extending beyond spacer means 18, at least in the plan subjected to compressive forces, must be sufficient to maintain a continuous sealing interface under the applied compressive forces, but insufficient to permit substantial distortion of the sealant and spacer strip under such applied compressive forces. There must be enough sealant to effect a seal, but not so much as to cause a disfiguring amount of "ballooning" of the sealant in the area bridging the surfaces of the two panel members.

As previously noted, spacer means 18 may be formed of plastic or aluminum. It may, however, be formed of alternative materials, including suitably treated paper such as waterproofed kraft paper, and the like. Depending upon the material used and the configuration of the spacer means, a wide variety of fabrication methods may be employed including extrusion, stamping, bending and casting, to name a few of the more common fabrication procedures.

The elongated ribbon of sealant has heretofore been described as "deformable", and this requires a word of explanation. The term "deformable" as used herein is intended to characterize a sealant, whether thermoplastic, thermosetting or thermoplastic-thermosetting, which, when used in the fabrication of composite structures contemplated by this invention, is at least initially incapable of resisting the compressive forces exerted upon it.

Thus, the term "deformable" is intended to characterize a material which, in an uncured state, is incapable of resisting compressive forces exerted upon it, even though upon curing, it is capable of resisting such forces. Further, the term "deformable" is intended to characterize a sealant which is initially incapable of resisting the compressive forces exerted upon it, and remains so throughout its useful life.

It will become apparent from the foregoing explanation that the spacer means embedded in a deformable sealant in accordance with the preferred embodiment of the present invention may serve only the temporary function of maintaining the spacing between two members until such time as the deformable sealant is cured to where the sealant itself is capable of resisting the compressive forces exerted upon the sealant and spacer strip. It will also be appreciated that the spacer means may function permanently as the sole means for maintaining proper spacing between two members, as in the case where the deformable sealant, being a true thermoplastic material, never becomes capable of resisting the compressive forces exerted upon it, at or above temperatures at which it flows.

It will, therefore, be understood that a wide variety of materials may be used as the deformable sealant including polysulfide polymers, urethane polymers, acrylic polymers, and the styrene-butadiene polymers. Included among the latter are a class of thermoplastic resins which, when below their flow temperature, exhibit elastic properties of vulcanized polymers. Such resins are sold by Shell Chemical Co under the trademark Kraton.

Where the present invention is employed in the fabrication of multiple glazed, transparent thermal insulating units formed of glass or plastic, it may be desirable to use a desiccant for the reason described above. Conveniently, the desiccant can be incorporated within the deformable sealant matrix, within the spacer means or within the facing materials. A particularly suitable class of materials for this purpose is synthetically produced crystalline zeolites made by Union Carbide Corporation under the name Linde Molecular Sieves. Another desiccant which may be used is silica gel. Combinations of different desiccants are also contemplated.

The preferred method of manufacturing the sealant and spacer strip in accordance with the present invention is by coextrusion. This can be accomplished with commercially available coextruding equipment which, in some instances, may require minor modification. In general, a previously formed or just formed spacer means is fed through the center of an extrusion die, and the deformable sealant is extruded around the spacer means. The composite material is then fed through a sizing die to obtain a sealant and spacer strip having the desired outside dimensions and the proper thickness of enveloping sealant extending beyond the spacer means. These coextrusion techniques are well known to those having ordinary skill in the art.

The provision of an orienting and/or decorative facing, if accomplished by coextrusions, may be achieved by the provision of a second coextrusion die which either precedes or following the sizing die. In the latter event, a second sizing die may be employed beneficially. Alternatively, the orienting and/or decorative facing may be applied adhesively or cohesively as a separate laminating process after the coextrusion of sealant and spacer means has been sized. The settings on the sizing dies will, of course, have to take into consideration the fact that the addition of the orienting and/or decorative facing will increase the overall dimensions of the sealant and spacer strip.

Figure 2:
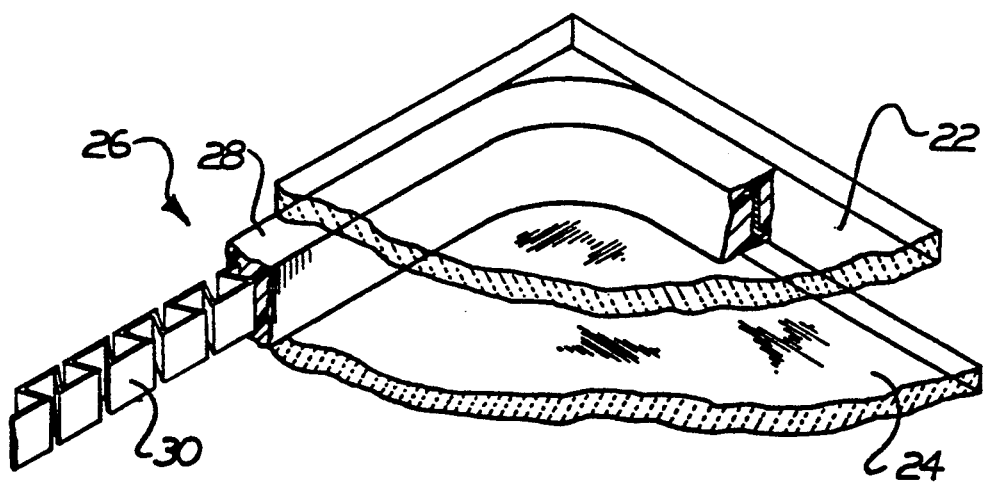
FIG. 2 is a fragmentary perspective view, with parts in section, showing a second embodiment of the present invention.

FIG. 2 shows a second embodiment of the invention wherein a composite structure comprises first and second members 22, 24 having facing, generally parallel surfaces spaced a finite distance from each other, and a sealant and spacer strip, designated generally as 26, maintaining members 22, 24 in spaced relationship and for effecting a seal between the facing surfaces thereof.

Sealant and spacer strip 26 comprises elongated body 28 of deformable sealant, and spacer means 30, enveloped by and embedded in the sealant and extending longitudinally of elongated body 28.

In the embodiment illustrated, spacer means 30 takes the form of a strip of material undulated to provide a continuous array of complementary triangular shapes.

This configuration, when compared with the spacer means in FIG. 1, provides considerably more convoluted edge per unit length of spacer means. It will be readily apparent, therefore, that the strength and thickness of the spacer means materials be equal, the embodiment of FIG. 2 will support higher compressive forces than will the embodiment in FIG. 1. However, as was the case with the FIG. 1 embodiment, the arrangement shown in FIG. 2 can be bent around corners, making this embodiment of sealant and spacer strip attractive for use where hermetic seals are needed.

The present invention will be better understood by reference to the following example:

EXAMPLE 1

A deformable window strip was formed in accordance with the preferred embodiment of the present invention as set forth above, and was utilized in the assembly of a double glazed thermal insulating glass unit. Shear flow values then were measured as directed in the Comite Europeen de Normalisation (CEN) Shear Flow Test Procedure 3.4. The measured shear flow values were from about 0.035 to about 0.038 inch.

What is claimed is:

1. A strip having adhesion and sealing properties when used as a separating means between substantially parallel glass panes as part of an insulated glass window system, said strip comprising:
   a desiccant;
   a deformable sealant material having top, bottom, outer and inner surfaces;
   a spacer having top and bottom surfaces embedded upon the inner or outer surface of the sealant or within the sealant, said spacer having compressive strength to resist forces placed upon the top and bottom surfaces of said sealant and said spacer being deformable when forces are placed upon the outer or inner surface of said sealant, said top and bottom surface of said sealant extending from about 0.005 to about 0.060 inches beyond said top and bottom surfaces of said spacer;
   said sealant material comprising an elastomeric-based semi-interpenetrating polymer network formed by mixing together an unfunctionalized polymer with a curable polymer and, subsequently, adding a curative to the mixture to effect crosslinking of the curable polymer, the unfunctionalized polymer being substantially uncrosslinked, said formed sealant material having a shear flow of less than 40 mils, according to CEN shear test procedure 3.4

2. The strip of claim 1 wherein the sealant is substantially devoid of rheological modifying fillers.

3. The strip of claim 1 wherein the top and bottom surfaces of said sealant extend about 0.0075 to about 0.015 inches beyond the top and bottom surfaces of said spacer.

4. The strip of claim 1 wherein the strip is substantially devoid of fillers which are black in color.

5. The strip of claim 1, wherein the unfunctionalized polymer is polyisobutylene and wherein the curable polymer is butyl rubber.

6. The strip of claim 5, wherein the butyl rubber is a copolymer comprising from about 97 to about 99 mole percent isobutylene and from about 1 to about 3 mole percent isoprene.

7. The strip of claim 5, wherein the butyl rubber is a phenol/formaldehyde resin.

* * * * *